Figures 1, 1A:
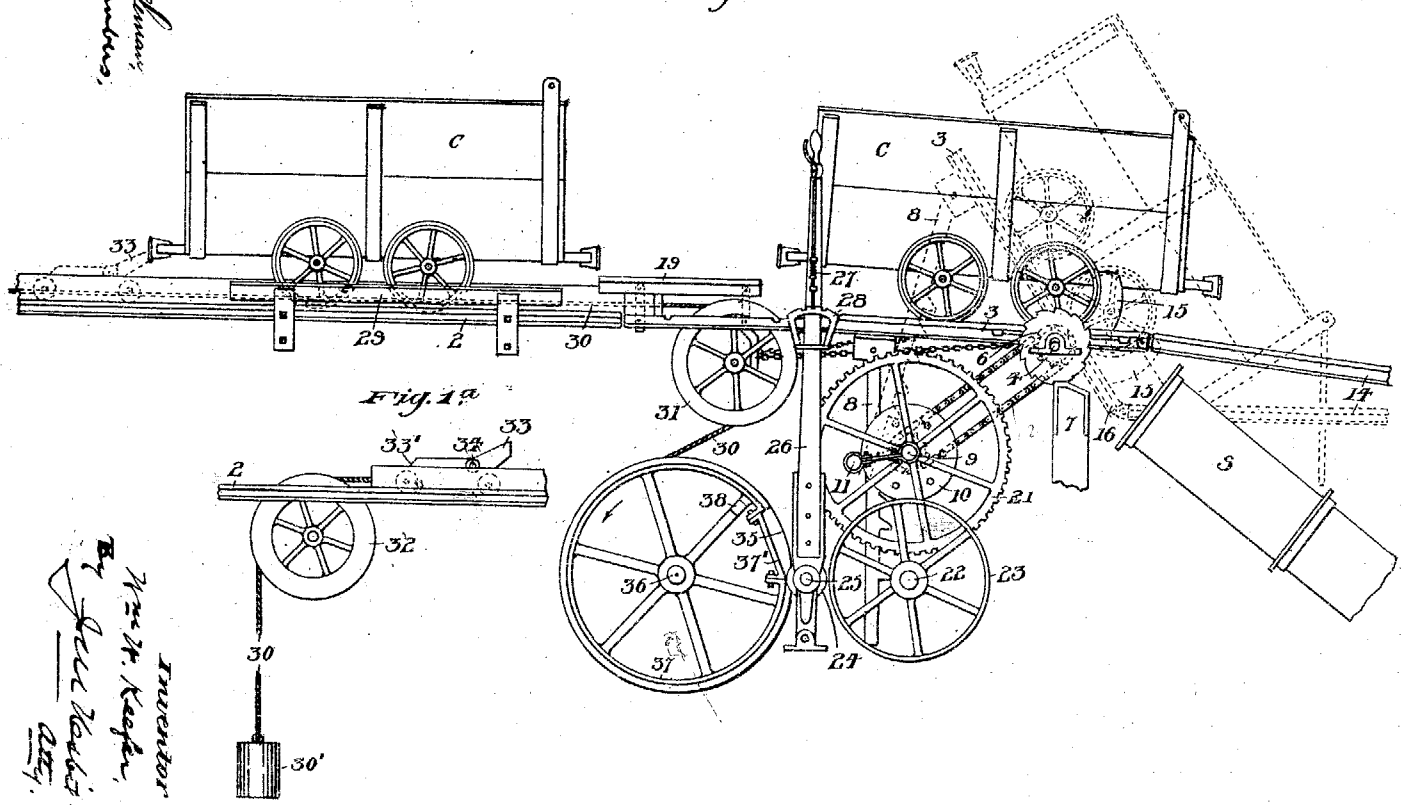

No. 12,550. REISSUED OCT. 30, 1906

W. W. KEEFER.

CAR HANDLING AND DUMPING APPARATUS

APPLICATION FILED SEPT. 8, 1906.

3 SHEETS—SHEET 1.

Witnesses:
J. P. Fyleman,
P. Chambers,

Inventor
Wm. W. Keefer,
By Jas. Kerr
Atty.

No. 12,550. REISSUED OCT. 30, 1906.
W. W. KEEFER.
CAR HANDLING AND DUMPING APPARATUS.
APPLICATION FILED SEPT. 8, 1906.
3 SHEETS—SHEET 2.
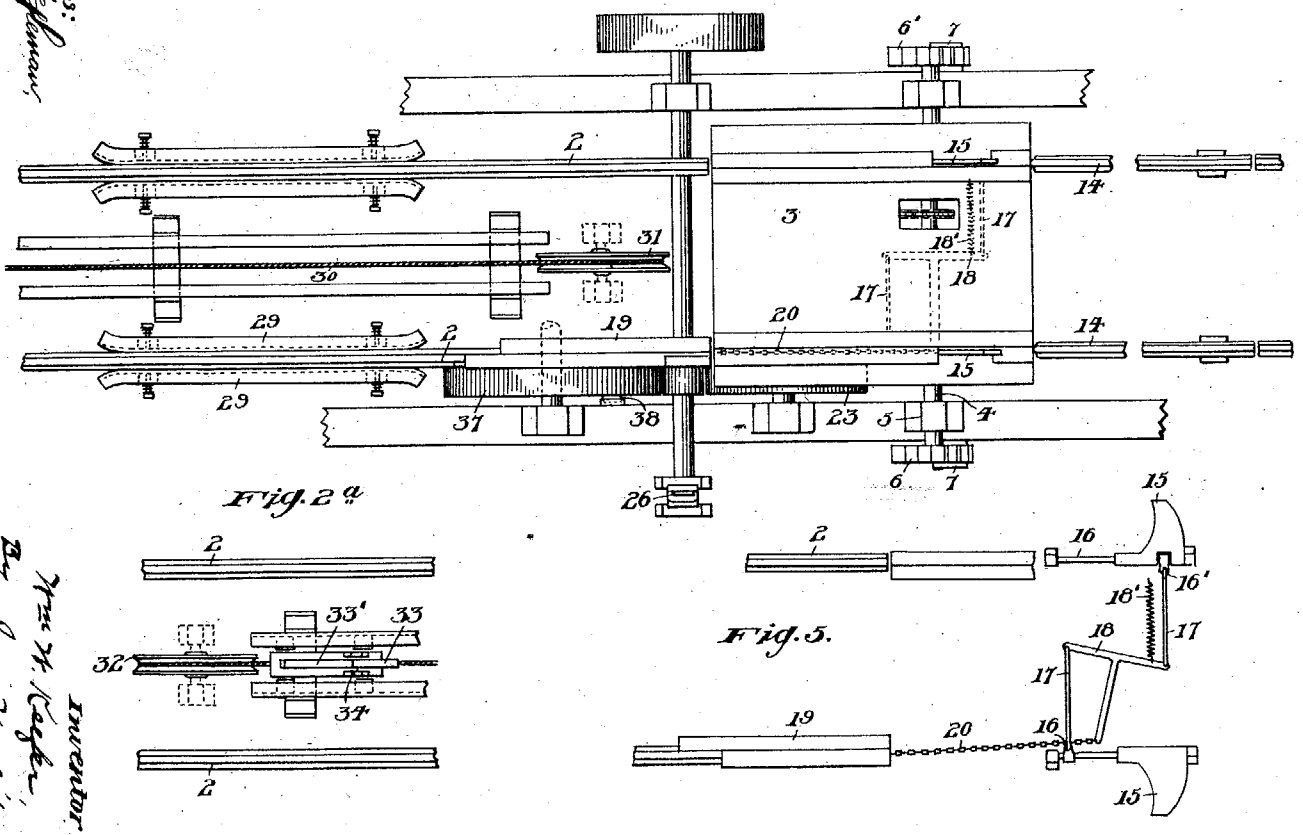
Witnesses:
J. P. Jeffleman,
F. E. Chambers
Inventor
Wm. W. Keefer,
By Jas. Kerbit
Atty.

No. 12,550. REISSUED OCT. 30, 1906.

W. W. KEEFER.

CAR HANDLING AND DUMPING APPARATUS.

APPLICATION FILED SEPT. 8, 1906.

3 SHEETS—SHEET 3.

Witnesses:
H. P. Affleman,
J. Chamber

Inventor
Wm. W. Keefer,
By Geo. Kadit
Atty

UNITED STATES PATENT OFFICE.

WILLIAM W. KEEFER, OF PITTSBURG, PENNSYLVANIA, ASSIGNOR TO WILLIAM W. KEEFER, OF PITTSBURG, PENNSYLVANIA, JAMES S. PATES, OF MONONGAHELA, PENNSYLVANIA, AND SAMUEL A. SCOTT, OF DUQUESNE, PENNSYLVANIA, COMPOSING COPARTNERSHIP OF COAL HANDLING MACHINERY COMPANY, OF PITTSBURG, PENNSYLVANIA.

CAR HANDLING AND DUMPING APPARATUS.

No. 12,550. Specification of Reissued Letters Patent. Reissued Oct. 30, 1906.

Original No. 827,373, dated July 31, 1906. Application for reissue filed September 8, 1906. Serial No. 333,353.

*To all whom it may concern:*

Be it known that I, WILLIAM W. KEEFER, a citizen of the United States, residing at Pittsburg, in the county of Allegheny and State of Pennsylvania, have invented certain new and useful Improvements in Car Handling and Dumping Apparatus, of which the following is a specification, reference being had therein to the accompanying drawings.

Car handling and dumping apparatus of the general character to which the present invention relates is usually located at a tipple, where loaded cars from a mine are dumped on screens which remove the slack and assort the lump-coal into requisite grades or sizes for the market. Car-dumping mechanisms unprovided with means for jolting or jarring the car while inclined are objectionable, for the reason that the coal is discharged on the screens in practically a single mass, this being as soon as the inclination of the car is sufficient to cause the coal to move therefrom by gravity. With this large body of coal moving down over the screens it is obviously impossible to screen all of it, much of the slack being carried over and detracting from the quality of what should be screened coal.

Mechanisms of prior design are open to the further objection that they require the unremitting attention of the operator in order to start and stop various parts thereof at the proper times and avoid damage resulting from excessive movement. Furthermore, the mechanisms in general use are expensive and being more or less complicated are susceptible to disorder.

The general purpose of the present invention is to provide apparatus for overcoming the difficulties noted above, one feature thereof being the provision of means for automatically jolting or shaking the car while it is being tilted, so that coal begins to discharge as soon as the car commences to tilt. This jarring or shaking may continue all the while the car is in tilted position, so that a practically constant stream of coal is caused to discharge on the screens until the car has been emptied, the discharge being in the nature of a thin layer as distinguished from a bulky mass comprising all or a large part of the car contents. Opportunity is thus afforded for effectually cleaning all the coal, and practically no slack passes over the screens. This automatic shaking or jolting may be variously accomplished. A preferred embodiment of the invention provides for a double or compound shaking or jolting of the car-support, the mechanism for raising the support when tilting having a jerking or jolting upward movement and the support-axis a similar movement. By thus doubly jolting the support while being tilted the coal is caused to discharge on the screen in a most effective manner.

It is characteristic of the invention that the jolting or jerking of the car is accomplished automatically and without the intervention of the operator, the tilting or tipping movement of the car-support being interrupted by a succession of automatically-imparted jolt-producing stops. Being entirely automatic, the desired movement not only requires no attention on the part of the operator, but is beyond his control so long as the dumping mechanism is in motion.

A further feature of the invention is the means employed for automatically moving the cars along the dump-approach and onto the dump proper, such mechanism being so arranged as to move the car a predetermined distance, when the propelling mechanism is stopped automatically or without the intervention of the operator.

Still a further feature consists in such a novel arrangement of the car-moving and car-dumping mechanisms that they may be operated alternately by a single drive under the control of one lever.

Figure 3:
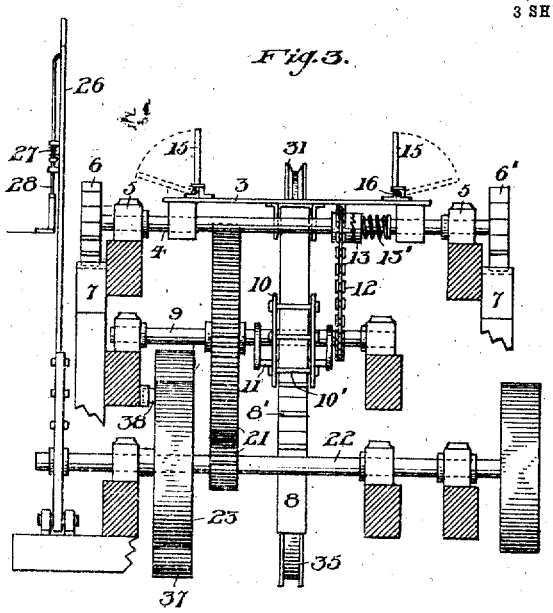
Figure 4:
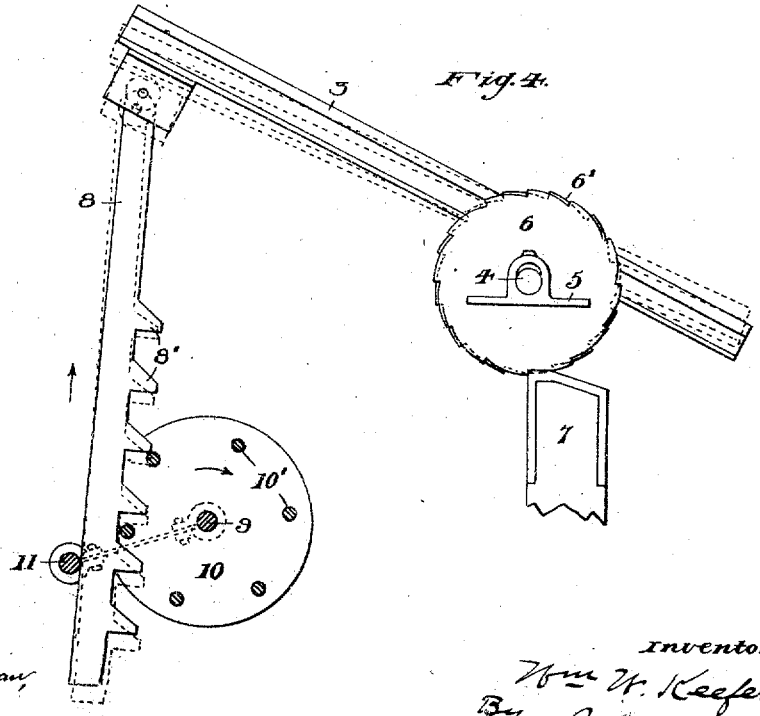

In the accompanying drawings, Figure 1 is a side elevation of the improved apparatus, the dumping portion thereof being shown in dotted lines, and Fig. 1[a] shows a continuation of the left-hand end of the apparatus of Fig. 1. Fig. 2 is a top plan view, and Fig. 2[a] shows a continuation of the left-hand end thereof. Fig. 3 is a view looking into the discharge end of the apparatus, the screen and other portions of the mechanism being omitted. Fig. 4 is a diagrammatic view illustrating the jolting movement of the tilting car-support. Fig. 5 is a detail view of the horn-operating mechanism, the horns being shown open, as in dotted lines in Fig. 3, for the forward passage of the dumped or empty car.

Referring to the drawings, 2 designates the tracks upon which the cars C approach the dump, and 3 is the tilting or dumping car-support secured to shaft 4. This shaft is capable of slight vertical movement in its bearings 5 and at its ends carries ratchet-like wheels 6 6′, which engage the upper ends of post 7.

In the present embodiment of the invention power is applied for raising or tilting the car-support, and it returns by gravity to horizontal position as distinguished from those dumps which tilt by gravity and are power-returned. Shaft 4 is located near the outer end of support 3, and for raising the inner end thereof a bar 8 is hinged to and depends from its under side, with one face provided with the teeth-like projections 8′. Journaled in the frame of the apparatus is shaft 9, and mounted thereon is toothed wheel 10, preferably constructed of separate disks connected by the circular series of e nly-spaced cross-pins 10′, which comprise the wheel-teeth. The spaces between pins 10′ are greater than the spaces separating bar-teeth 8′, which they engage, thus creating an uneven mesh, the result being that in elevating platform 3 when a pin 10′ disengages a tooth 8′ the next succeeding pin 10′ is an appreciable distance below the next bar-tooth 8′, and hence bar 8 slips backward until it is caught by the engagement of the last-mentioned tooth and pin. This operation is clearly illustrated in Fig. 4. Thus support 3 is raised by a series of partially-receding upward movements, each of which jars or shakes support 3 and the car thereon being tilted. Bar 8 is embraced by yoke 11, adapted to oscillate vertically on shaft 9 and which operates to hold the bar in engagement with wheel 10.

A chain drive 12 connects shafts 9 and 4, so that as shaft 9 is operated through the medium of wheel 10 to tilt support 3 shaft 4 is rotated and vibrated vertically by the movement of the ratchet-wheels 6 6′ over posts 7, thereby shaking or jolting the car-support at its tilting axis as well as at its free or raising end. As shown in the drawings, particularly in Fig. 4, wheels 6 and 6′ are preferably arranged with their notches out of line, so that shaft 4 receives a jolt first at one end, then at the other, this movement being more effective in loosening and starting the coal within the car than straight vertical vibrations of shaft 4, which would result from wheels 6 6′ being in register or with their notches in line.

A ratchet-clutch 13, in connection with spring 13′, holds chain drive 12 in rigid engagement with shaft 4 when support 3 is moving upward; but when the motion is reversed shaft 4 and wheels 6 6′ are stationary.

An inclined screen S may be supported in any convenient manner for receiving the contents of the car when dumping. Rails 14, pivoted to the outer end of support 3, so as to tilt therewith, are adapted when in raised position to connect with a return-trackway, (not shown,) over which the car passes after being emptied.

Mechanism of any suitable design may be provided for holding the car on support 3 and for releasing the empty car for passage forward over track 14. The mechanisms here shown, for which no novelty is claimed, consist of the vertically-oscillating horns 15, secured to rock-shafts 16 beneath and paralleling the rails of support 3. Depending arms 16′ of each shaft are connected by links 17 to opposite ends of a T-shaped lever 18, shafts 16 being held normally with horns 15 in raised position by spring 18′. As is usual in this form of apparatus, provision is made for causing horns 15 to turn outwardly, as in dotted lines in Fig. 3, after the car has been dumped and returned to horizontal position, this movement of the horns being usually accomplished automatically by the next approaching car. The automatic mechanism here shown consists of a depressible oscillating track-section 19 in approach 2, having a depending arm connected by chain 20 with an arm or lever 18. Thus as the next loaded car approaches the tilting car-support it moves tread 19, and thereby so operates the horn mechanism as to place it in position shown in Fig. 5, with the horns turned outwardly, when the empty car may be pushed forward onto track 14 by the next approaching car and out of the way. As soon as the loaded car moves over tread 19 the latter is raised and the horns restored to normal or upright position by the action of spring 18′ for engaging and holding the car, which causes them to spread. Lever 18 may be fulcrumed to the under side of support 3, and its position with relation to shaft 4 is such that its operation is not disturbed by the tilting of support 3.

For driving shaft 9 gearing 21 connects the same with shaft 22, and secured on the latter is friction drive-wheel 23, the periphery of which is adapted to be engaged by the small wheel 24, carried by power-shaft 25, wheel 24 being located at such distance from the bearings of shaft 25 that the latter may be deflected slightly without impairing its efficiency. For thus deflecting the shaft a lever 26 is provided, which may extend upwardly within convenient reach of the operator and be equipped with a spring latch mechanism 27, operating in connection with a quadrant 28 for holding the lever in desired adjustment.

Approach-tracks 2 are provided with the usual brake-bars 29, of well-known construction, which frictionally embrace the wheels of an approaching loaded car and stop it before it reaches the dumping apparatus. The arrangement is such that when the tipple is in continuous use a loaded car is always in about the position indicated at the left hand of Fig. 1, ready to be moved forward onto the tilting car support or dump. For advancing the loaded car from this position over horn-operating bar 19 and onto car-support 3 a cable 30 is provided, which at its inner end passes downward over sheave 31 and at its outer end over sheave 32, at which end it is provided with weight 30′. Secured to the cable at a proper point for engaging the rear end of the loaded car is the latch-like device or dolly 33, which is pivoted between its ends at 34, with its rear end 33′ of such weight as to hold the dolly normally in position to engage a car, as indicated by Fig. 1[a]. When, however, it is necessary for the dolly to pass backward beneath a car, it will tilt and pass beneath the running-gear thereof, as will be readily understood. Cable 30 is adapted to wind on sheave 35, mounted on shaft 36, and also secured to this shaft is actuating friction-wheel 37, which is in the plane of wheel 23 and so spaced therefrom that drive-wheel 24 may be caused to engage its periphery by a movement of lever 26, as above described. Thus the same driving and controlling mechanism operates both the tipping mechanism and the car-advancing mechanism.

The periphery of wheel 37 is provided with an inset 37′, so that after said wheel makes almost a complete revolution in the direction indicated by the arrow in Fig. 1, as when winding the cable, this inset is brought into the plane of drive-wheel 24, and its forward movement ceases. Its movement, however, is sufficient to advance the loaded car onto dumping-platform 3. Thus means is provided for automatically stopping the forward movement at the proper time and without the intervention of the operator, so that danger of accident owing to winding of the cable continuing too long is avoided. When wheel 24 is released from frictional contact with wheel 37, weight 30′ operates to unwind the cable from sheave 35, restoring the dolly to position for effecting the advance of the next car. This backward movement may be controlled by a stop 38, carried by wheel 37, engaging a portion of the frame, as shown in Figs. 1 and 2, thereby always stopping said wheel at the initial or starting position. (Indicated in Fig. 1.)

With shaft 25, power-wheel 24, and lever 26 arranged as shown, movement of the lever in one direction engages wheels 24 and 23 and the lifting of the tilting car-support is begun. At the same time wheel 37 is released and it and the cable are permitted to return to their normal position, as above described. After support 3 has been fully raised a reverse movement of lever 26 releases wheel 23, when support 3 and bar 8 lower by gravity to normal position. Simultaneously with this operation wheel 24 is so driving wheel 37 as to advance the next car to the tilting support, and this next car may be operated to push the unloaded car forward onto tracks 14, the unloaded car being at that time released by horns 15, swinging outwardly, as heretofore described. The arrangement is preferably such that the last or lowermost tooth 8′ of bar 8 is in engagement with wheel 10 when the full tilting position is reached, so that even though the driving mechanism is not immediately stopped no harm can result, as until it is stopped the dump will simply continue the jarring movement transmitted through the last tooth 8′.

While the dumping mechanism and means for advancing the car on the approach may be combined in forming a complete and efficient tipple and be operated by one and the same driving power, either of said mechanisms may be used to the exclusion of the other without departing from the invention, and it is clear that other and different forms of driving mechanisms may be employed.

I claim—

1. In car-dumping apparatus, car-tipping means, in combination with automatically-acting car-jolting mechanism.

2. In car-dumping apparatus, a tilting car-support, and automatically-acting means for jolting the support.

3. In car-dumping apparatus, a tilting car-support, and means for imparting a jolting upward movement to one end of the support.

4. In car-dumping apparatus, a vertically-oscillating car-support, and means for jolting the support-axis.

5. In car-dumping apparatus, a vertically-oscillating car-support, and means for simultaneously elevating and jolting one end of the support.

6. In car-dumping apparatus, a vertically-oscillating car-support, means for jolting the support-axis, and means for elevating and jolting the free end of the support.

7. In car-dumping apparatus, a vertically-tilting car-support, and support-elevating means having a hit-and-miss connection with the support, whereby the support is raised by a jerking or jolting movement.

8. In car-dumping apparatus, a vertically-tilting car-support, a toothed lifting-bar extending therefrom, and an actuating-wheel having a hit-and-miss connection with the bar-teeth.

9. In car-dumping apparatus, a vertically-tilting car-support, a toothed lifting-bar extending therefrom, and an actuating-wheel for the bar having teeth spaced differently from the bar-teeth.

10. In car-dumping apparatus, a vertically-tilting car-support, a toothed lifting-bar extending therefrom, and an actuating-wheel meshing with the bar-teeth and having teeth more widely separated than the bar-teeth.

11. In car-dumping apparatus, a tilting support, a toothed actuating-wheel, and a toothed bar meshing with the wheel for actuating the support, the length of the series of the bar-teeth corresponding to the movement of the support, whereby the support is fully tilted when the last tooth of the series is in engagement with the wheel, for the purpose described.

12. In car-dumping apparatus, a tilting car-support, a toothed actuating-wheel, and a bar for tilting the support having a series of teeth spaced differently from the teeth of said wheel and adapted to mesh therewith, the length of the series of bar-teeth corresponding to the movement of the support, whereby the support is fully tilted when the last tooth of the series is in engagement with the wheel, for the purpose described.

13. In car-dumping apparatus, a vertically-tilting car-support, support-tilting means, wheels rotatable on the support and having irregular peripheries, wheel-rotating means, and fixed devices against which the wheels bear.

14. In car-dumping apparatus, bearings, a tilting car-support adapted to oscillate and play vertically in the bearings, wheels movable vertically with the support and having irregular peripheries, wheel-rotating means, and fixed devices against which the wheels bear.

15. In car-dumping apparatus, bearings, a tilting car-support adapted to oscillate and play vertically in the bearings, and means for causing said vertical play.

16. In car-dumping apparatus, a shaft movable vertically in its bearings, a tilting car-support mounted on the shaft, wheels carried by the shaft having irregular peripheries, fixed surfaces upon which the wheel peripheries bear, a bar for tilting the support, an actuating-wheel for the bar, and means for simultaneously rotating the last-mentioned wheel and the support-sustaining shaft.

17. In car-dumping apparatus, a shaft movable vertically in its bearings, wheels carried by the shaft having irregular peripheries, fixed surfaces upon which the wheel peripheries bear, a vertically-movable bar for tilting the support, a second shaft, a wheel on said shaft for actuating the bar, means for rotating said second shaft, and gearing connecting the latter with the support-sustaining shaft.

18. In car-dumping apparatus, a tilting car-support having a vertically-movable axis, a bar for raising one end of the support, actuating means for said bar, and an operative connection between said actuating means and the support-axis for causing the latter to move vertically in its bearings.

19. In car-dumping apparatus, a tilting car-support, actuating means therefor, a car-approach for the support, mechanism for moving a car along the approach and onto the support, and means operating automatically to stop the movement of the car-actuating mechanism.

20. In car-dumping apparatus, a tilting car-support, a car-approach for the support, a forwardly and backwardly moving car-engaging cable for the approach, winding means for the cable, and means for automatically stopping the winding mechanism at a predetermined point.

21. In car-dumping apparatus, a tilting car-support, a car-approach for the support, car-moving means for the approach, a wheel for actuating the car-moving means, said wheel having an offset in its periphery, and a friction-drive adapted to engage the wheel periphery and rotate the same until it encounters said offset.

22. In car-dumping apparatus, a tilting car-support, a car-approach for the support, a cable adapted to move a car along said approach, a sheave upon which the cable winds when moving forward, mechanism for turning said sheave a predetermined distance, and a weight operating to draw backward and unwind the cable.

23. In car-dumping apparatus, a tilting car-support, mechanism for actuating the same, a car-approach for the support, car-propelling means for the approach, and driving means common to the car-propelling means and the support-actuating mechanism.

24. In car-dumping apparatus, a tilting car-support, actuating mechanism therefor having a drive-wheel, a car-approach for the support, car-propelling mechanism for the approach having a drive-wheel in the plane of the first-mentioned drive-wheel, and a power-wheel positioned between and adapted to engage either of said drive-wheels.

25. In car-dumping apparatus, a tilting car-support, actuating mechanism therefor having a drive-wheel, a car-approach for the support, car-moving mechanism for the approach having a drive-wheel in the plane of the first-mentioned drive-wheel, a power-shaft, a wheel on said shaft positioned between and adapted to engage either of said drive-wheels, and an operating-lever for said shaft.

26. The combination of car-emptying means, a car-approach therefor, mechanism for moving a car along the approach toward the emptying means, and means operating automatically to stop the movement of the car-actuating mechanism.

27. The combination of car-tilting mechanism, a car-approach therefor, mechanism for moving a car along the approach and into position for tilting, and means operating automatically to stop the forward movement of the car-actuating mechanism.

28. The combination of a car-approach, car-moving means for the approach, a wheel for actuating the car-moving means, said wheel having an offset in its periphery, and a drive-wheel for the last-mentioned wheel adapted to engage and rotate the same until it encounters said offset.

29. The combination of a car-approach, a cable adapted to move a car along the approach, a sheave upon which the cable winds when moving forward, mechanism for turning said sheave a predetermined distance, and a weight operating to draw backward and unwind the cable.

In testimony whereof I affix my signature in presence of two witnesses.

WILLIAM W. KEEFER.

Witnesses:
J. M. NESBIT,
P. S. CHAMBER